United States Patent

[11] 3,633,701

[72] Inventors Ted L. LeTourneau;
     Hilmer C. Lindahl, both of Longview, Tex.
[21] Appl. No. 32,048
[22] Filed Apr. 27, 1970
[45] Patented Jan. 11, 1972
[73] Assignee R. G. LeTourneau, Inc.
     Longview, Tex.

[54] STEERING METHOD AND SYSTEM EMPLOYING ELLIPSOIDAL RELATIONSHIPS
17 Claims, 10 Drawing Figs.

[52] U.S. Cl................................................ 180/79.1, 244/77
[51] Int. Cl..................................................... B62d 5/04
[50] Field of Search........................................ 180/79.1; 244/77

[56] References Cited
UNITED STATES PATENTS
2,248,251   7/1941   Reeves...................... 180/79.1
3,280,931  10/1966   Cahill et al................ 180/79.1 X Primary Examiner—A. Harry Levy
Attorney—Wofford and Felsman ABSTRACT: Method of and apparatus for steering a vehicle having two separately steerable wheels and respective separate steering means characterized by imparting a steer signal to both steerable wheels, comparing the relative degrees of steer of the respective wheels by way of an ellipsoidal programmer and modifying the steer signal to the steerable wheel that departs from its correct relative degrees of steer with respect to the other steerable wheel. The relative degrees of steer are defined by the ellipsoidal programmer. The ellipsoidal programmer employs the equivalent of two identical ellipses that are placed tangential such that their focal points on their major axes form the apices of a rectangle at the position equivalent to zero degrees of steer, are mounted on pivotal shafts located at opposite first focal points and have their other respective and opposite focal points free to move in a plane as the driving ellipse drivingly rotates the driven ellipse through a connection that is equivalent to being retained tangential. The driving ellipse is rotated twice the number of degrees a first steerable wheel is being steered, and the output from the driven ellipse can be compared directly with twice the degrees of steer of the other steerable wheel. A preferred embodiment in which the modifying of the steer signal comprises interrupting the steering signal to the steerable wheel that is being steered more than its correct relative degrees of steer with respect to the other steerable wheel, and specific apparatus are also disclosed.

PATENTED JAN 11 1972

INVENTORS:
Ted L. LeTourneau
Hilmer C. Lindahl
BY
Wofford & Felsman
ATTORNEYS

STEERING METHOD AND SYSTEM EMPLOYING ELLIPSOIDAL RELATIONSHIPS

BACKGROUND OF THE INVENTION

1. Field of the Invention

The invention relates to a system for steering a wheeled vehicle. More particularly it relates to a system effecting differential steering to widely separated, individually steerable wheels.

2. Description of the Prior Art

The prior art has recognized that in order to obtain perfect steering without drag or slippage on one of the steerable wheels, it is essential that different degrees of steer be imparted to the inside wheel on the turn as compared with the outside wheel on a turn.

The conventional method of achieving the different degrees of steer that must be imparted to the inner and outer steerable wheels is by means of a mechanical tie bar and drag link assembly oriented in the correct position to compensate for this difference in steer. While the tie bar and drag link assembly are employed in conventional vehicles, they are not suitable for many large load-carrying vehicles having widely spaced, individually steerable wheels; and particularly, are not applicable to those carrying underslung loads such as the mobile-type Gantry cranes. Since the space between the wheels must be free and clear of any obstruction to handle cargo therein, the tie bar and drag link assembly cannot be employed without use of large and rigid mechanical levers being brought up the legs of the Gantry crane. Moreover in such heavy vehicles the force attending imperfect steerage is often great enough to cause structural damage, instead of merely dragging the tires on the pavement.

The prior art solutions attempting to solve the problem have employed hydraulic cylinder movement in conjunction with multiple and complex linkage arrangements to effect differential hydraulic fluid flow to one of the steerable wheels as compared with the other. Other attempts to solve the problem have invoked the use of four-wheel steering, each wheel individually steerable through 360° of rotation and requiring elaborate means for maintaining the proper interrelationship between the four wheels. None of the prior art solutions have been satisfactory in providing a simple, economical method or system for effecting a nearly perfect turn by a large vehicle having widely spaced, individually steerable wheels.

DESCRIPTION OF PREFERRED EMBODIMENTS

It is a primary object of this invention to obviate the disadvantages of the prior art steering arrangements for wheeled vehicles and provide a simple, economical method and system for effecting a nearly perfect turn by a wheeled vehicle.

In copending U.S. Pat. application Ser. No. 768,998, entitled "Method and System for Steering a Vehicle," filed Oct. 21, 1968, by Ted L. LeTourneau, one of the inventors of this invention, and since abandoned in favor of continuation application, Ser. No. 31,858 filed May 1, 1970, which has issued as U.S. Pat. No. 3,586,117, use of a unique ellipsoidal program for effecting the correct relationship between respective steer signals sent to the steerable wheels was described. In a specific embodiment described in that application, a first controller-follower sensed the steer signal and, through an ellipsoidal programmer means, positioned a second controller-follower; and the output from the respective controller-followers effected the correct degrees of steer. This invention comprises an improvement in that basic invention, the improvement being advantageous in providing for more direct control of steer by the operator and in other ways that will become apparent from the description hereinafter. The improved steering system of this invention maintains the correct relative degrees of steer of the respective steerable wheels within a predetermined error range. As long as the steerable wheels stay within the error range, no correction is made. When there is a departure from the error range, a correction is made on the steer signal being sent to one of the steerable wheels to tend to bring the relative degrees of steer again within the error range.

Figures 1, 2, 3A, 3B, 3C:
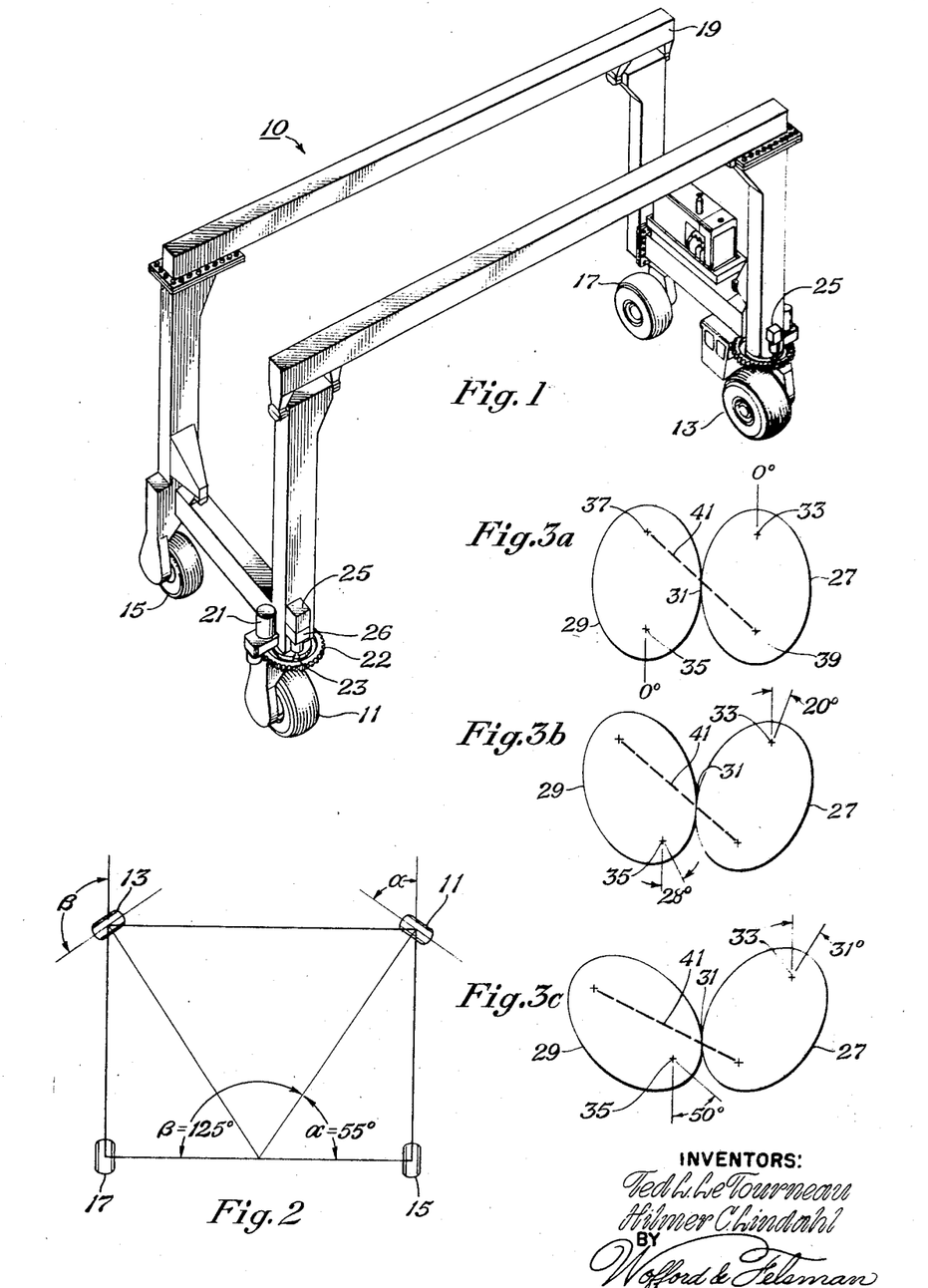
FIG. 1 is a perspective view of a portion of a wheeled vehicle advantageously employing the invention.
FIG. 2 is a design illustration schematically showing the location and maximum degrees of steer of separately steerable wheels to effect a turn about the midpoint of a line connecting two nonsteerable wheels of a vehicle.
FIGS. 3a, 3b, and 3c are diagrams of tangential ellipses illustrating the principles employed in the invention.

Referring to FIG. 1, a large vehicle 10 has wheels 11 and 13 that are individually steerable whereas wheels 15 and 17 are not. The wheels are maintained widely separated by frame 19 providing space and handling apparatus between the wheels to facilitate handling of cargo; the specific cargo-handling apparatus not being shown since it is well known and does not form a part of this invention. Each of the steerable wheels 11 and 13 has a steering means such as steering motor 21 engaging a steering gear 22 and operable to effect a desired degree of steer throughout 360° of steer, in response to a suitable steer signal.

Also, each of the steerable wheels has a gear train 23 serving as a multiplier means for doubling the degrees of steer of each respective wheel; for example, from a straight-ahead position, or position of 0° of steer. The output of the gear train thus is adapted to generate a representation that is a function of twice the degrees of steer of the respective wheel.

Each wheel has a selsyn unit 25, serving as a sensing means, connected with and ultimately responsive to the respective multiplier means. The selsyn unit 25 is also electrically connected, as described hereinafter, so as to effect a respective output signal that is a predetermined function of the respective first representations from the multiplier means.

A programmer means 26 is associated with one of the wheels and is connected with one of the sensing means so as to modify what would otherwise be an unmodified output signal of the sensing means. The resulting modified output signal is related to the unmodified output signal in accordance with the ellipsoidal program. Specifically, programmer means 26 is interposed between the multiplier means 23 and the sensing means 25 on the right steerable wheel 11. Programmer means 26 may be associated with either steerable wheel, as most convenient.

The remaining elements of the system may be emplaced in the operator's console and will be described in more detail with respect to FIGS. 4-8 hereinafter.

With a vehicle such as illustrated in FIG. 1, the shortest turning radius is effected if the vehicle rotates about the midpoint of an imaginary line drawn between the outside nonsteerable wheels 15 and 17. Thus, employing a design scale model similar to the one illustrated in FIG. 2, the maximum angle $\alpha$ through which the outside wheel will be required to steer and the maximum angle $\beta$ through which the inside wheel will be required to steer can be determined. While the angles $\alpha$ and $\beta$ refer to selected maximum angles to effect a turn about a particular point; such as, the midpoint of a line between the nonsteering wheels, the steerable wheels in this invention may be steered throughout 360°, if desired for greater flexibility in manipulating the wheeled vehicle. For steering a vehicle 20 feet long and 27½ feet wide about the midpoint of the line between the nonsteering wheels, the angle α will be 55° and angle β, which is a supplement to α, will be 125°.

These maximum angles of steer, α and β, are significant in designing the identical tangential ellipses, or their equivalent, which are employed in the programmer means. While the major axes for the identical ellipses may be arbitrarily chosen, the distance between the focal points on each major axis is the length of the respective major axis multiplied by the cosine of the angle α. Similarly, the length of each minor axis is the length of the major axis multiplied by the sine of α.

FIGS. 3a, 3b, and 3c illustrate the principle upon which the unique ellipsoidal program is based. Therein, identical ellipses 27 and 29 are placed tangential at point 31 such that the focal points on their major axes form the four apices of a rectangle at the position equivalent to 0° of steer of the steerable wheels of the vehicle illustrated in FIG. 1. Ellipses 27 and 29 are rotatable about their respective opposite focal points 33 and 35. Focal points 33 and 35 are disposed a fixed distance apart and are fixed in space. Ellipses 27 and 29 have their other, respective, focal points 37 and 39 along their major axes maintained in fixed spaced relationship as illustrated by dashed line 41, but free to move in their plane of rotation. As a consequence of their fixed spaced relationship, ellipses 27 and 29 are maintained tangential. One ellipse serves as the driving ellipse, and the other ellipse serves as the driven ellipse.

When ellipse 27 is rotated about its focal point 33 through a number of degrees; for example, 20° in the clockwise direction as shown in FIG. 3b; ellipse 29 is rotated counterclockwise about its focal point 35 an angle of 28° to retain tangential point of contact 31. The relationship between the relative degrees of rotation; namely, 20° for ellipse 27 and 28° for ellipse 29; is the same as that between the degrees of steer that must be imparted respectively to the outer wheel and the inner wheel in making a nearly perfect, large radius turn with a vehicle having the dimensions illustrated in FIG. 2. The actual degrees of steer for the respective wheels are, however, only 10° and 14°, or one-half the relative degrees of rotation.

Similarly, as illustrated in FIG. 3c, when ellipse 27 is rotated further through a larger angle such as 31°, ellipse 29 is counter rotated further through a much larger angle of 50°; and these respective degrees of rotation are twice the degrees of steer that must be imparted, respectively, to the outer wheel and the inner wheel when the vehicle is making a sharper rate of turn.

Figure 4:
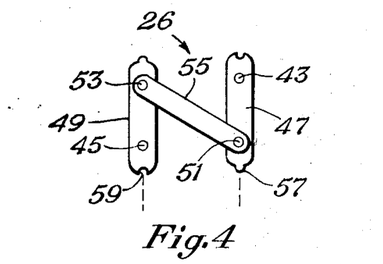
FIG. 4 is a top plan view of one embodiment of the programmer means employed in this invention.

Programmer means 26 may employ the identical ellipses illustrated in FIG. 3a or it may employ linkage equivalents similar to those illustrated in FIG. 4. Either the ellipses or the linkage equivalents are mounted on respective shafts 43 and 45 for rotation about respective focal points 33 and 35. Respective rigid connection means such as levers 47 and 49 are rigidly connected with respective shafts 43 and 45 for transmitting the torque from the driving shaft to the driven shaft. Respective connecting means such as pins 51 and 53 are located at the other respective focal points 39 and 37 and are connected by suitable linkage such as bar 55. Bar 55 is employed, as illustrated by dashed line 41 in FIGS. 3a–c to maintain the respective connecting means representing the movable focal points 37 and 39 the same distance apart so as to retain the equivalent of a tangential point between the ellipses.

In order for the relationship of the ellipses to continue to be the same for the inside and outside steerable wheels on the vehicle making the turn, the fixed focal points 33 and 35 must be opposite focal points and not adjacent; that is, they must not be on the same side of the lever equivalent to dashed line 41. Yet, it is apparent that, in extrapolating the trend illustrated in FIGS. 3a–c, dashed line 41 will ultimately align movable focal points 37 and 39 with fixed focal point 35. This position is referred to as dead center position. From this dead center position further turning of ellipse 27 could cause the lever equivalent to dashed line 41 to move back in the direction whence it came. In this way, fixed focal points 33 would be on the same side as fixed focal point 35 and no longer be opposite focal points; in which case the relationship breaks down. It is imperative, therefore, that a means be provided to move the ellipses, or their equivalents, from a dead center position such that the fixed focal points are maintained as opposite focal points rather than adjacent focal points.

If gear teeth are employed about the periphery of ellipses, no problem is encountered in this regard. Similarly, if a sector of gear teeth having an effective radius equal to the major axis multiplied by (sine α)² is employed at the respective ends of the ellipses such that they mesh at the dead center position, the problem is alleviated, since rotation of one ellipse ensures counter rotation of the other. As illustrated, programmer means 26 employs a single meshing means such as male member 57 and female member 59 attached to the levers 47 and 49 and located at the point equivalent to the maximum dimension of the major axis of each respective ellipse. The respective meshing means move the respective levers from a dead center position to maintain the shafts and the respective pins 51 and 53, serving as the focal points, as opposite focal points.

Figure 5:
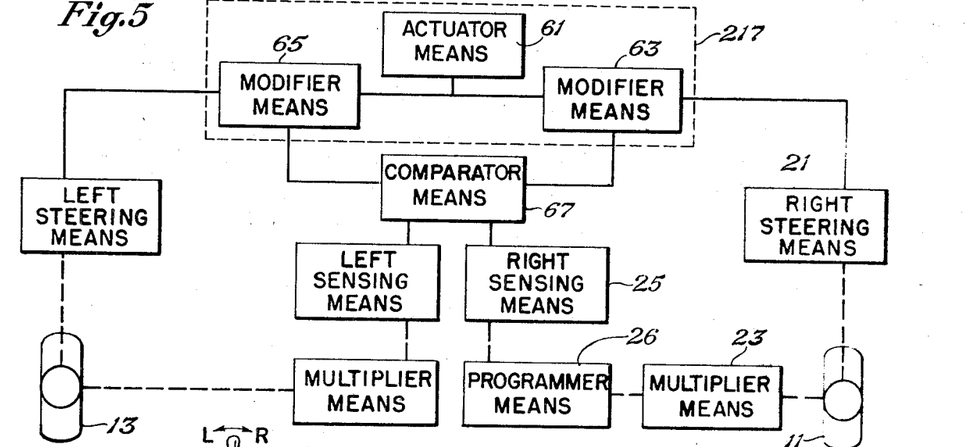
FIG. 5 is a block diagram illustrating schematically one embodiment of the invention.

One embodiment of the invention is illustrated by the block diagram of FIG. 5. Therein, actuator means 61 is connected via respective modifier means 63 and 65 with right and left steering means such as steering motor 21.

The right and left steering means 21, the steerable wheels 11 and 13, the multiplier means 23, the programmer means 26, and the right and left sensing means 25 have been illustrated hereinbefore with respect to FIG. 1. As indicated therein, the steering means steer the wheel and the degrees of steer imparted to the wheel is doubled and fed to the sensing means. The programmer means is interposed in series connection with one of the multiplier means and its associated sensing means. In this way, the right and left sensing means are in alignment when the correct relative degrees of steer have been imparted to the respective steerable wheels and may be directly compared by comparator means 67.

Comparator means 67 senses the wheel that is being steered more or less than its correct relative degrees of steer with respect to the other steerable wheel and signifies either modifier means 63 or 65 to modify the steer signal from actuator means 61 to the respective wheel that departs from its correct relative degrees of steer. For example, comparator means 67 may determine that an inside wheel on a turn of the vehicle is being steered less than its correct relative degrees of steer and signal the respective modifier means to increase the steer signal to the inside wheel, as by increasing the voltage to the respective steering means. Alternatively, comparator means 67 may determine that an outside wheel on a turn is being steered more than its correct relative degrees of steer and may signal the modifier means to decrease the steer signal, as by interrupting the steer signal or decreasing the voltage to the steering means associated with the outside wheel.

Figure 6:
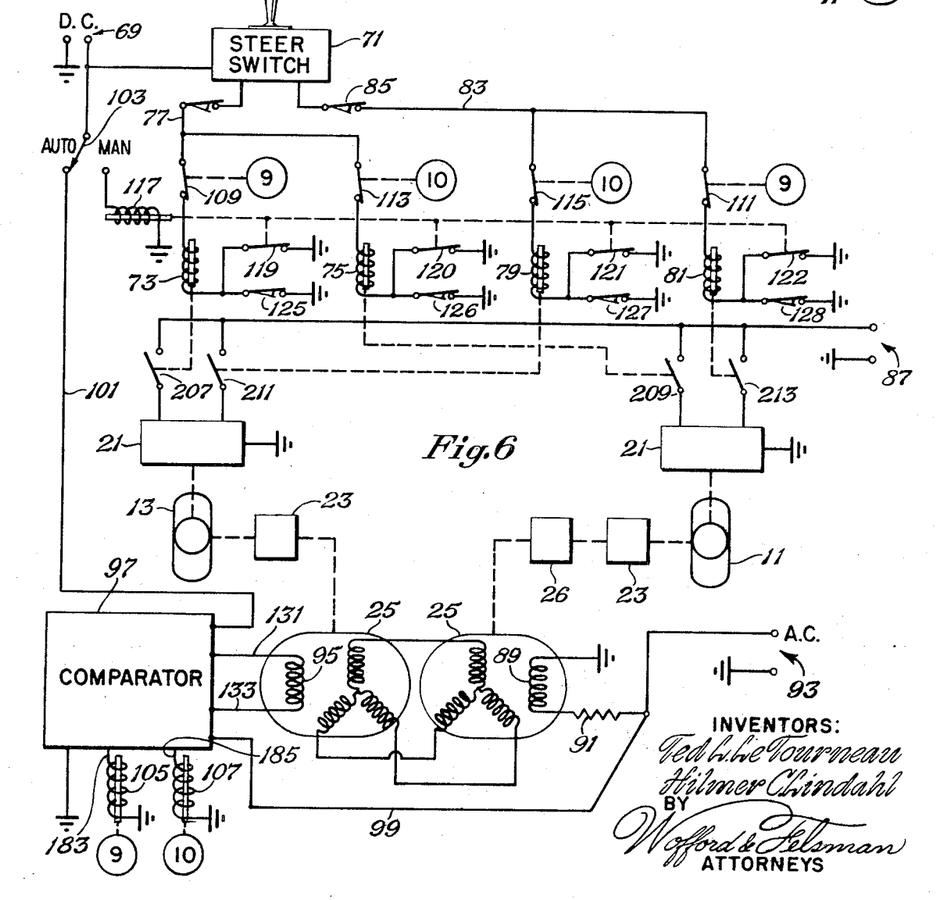
FIG. 6 is a schematic illustration, partly in block form, of one embodiment of the system illustrated in FIG. 5.

An embodiment in which the modifier means is an interrupter means for interrupting the steer signal to the wheel that is being steered more than its correct relative degrees of steer is illustrated in FIG. 6. Therein, a power source 69; such as one supplying a negative 24-volt direct current (−24 v. DC); is connected with steer switch 71. Steer switch 71 is serially connected with left steering relays 73 and 75 via conductor 77. Steer switch 71 is also connected with right steering relays 79 and 81 via conductor 83. If desired, normally closed limit switches 85 may be interposed in conductors 77 and 83 to limit the degrees of steer that may be imparted to the respective right and left steerable wheels. Whether or not the limit switches are incorporated will depend upon other and well known variables; such as, whether or not the nonsteering wheels are powered and whether or not the power that is supplied thereto goes through the steering mechanism such that one nonsteering wheel may be reversed if the turn is so short that it, in fact, must travel backwards. In vehicles in which only the steerable wheels are powered, the relationships of the correct relative degrees of steer effected by the ellipsoidal program are good throughout 360° of turn, and such vehicles can be made to reverse their direction through appropriate steer of the steerable wheels. In such vehicles, the limit switches 85 are omitted from conductors 77 and 83. Limit switches 85 are, ordinarily, desirable to protect equipment against malfunctions such as a sticking contactor.

As indicated by the dashed lines, the left steering relays 73 and 75 and the right steering relays 79 and 81 serve to close respective switches between the steering motor 21 and a power source illustrated generically at 87. In fact, in a specific embodiment, a 140-v. alternating current (AC) source is employed to close contactors connecting the steering motors 21 with a three-phase, 440-v. AC source to supply the requisite torque for the 20-horsepower steering motors. The power source 69, steer switch 71, and the respective relays and switches serve as actuator means 61 for effecting a steer signal to the respective steering means.

The respective steering means 21 are connected with respective steerable wheels for effecting a degree of steer in response to the steer signal. Each steerable wheel, in turn, rotates the gear train 23, serving as multiplier means 23, that is connected ultimately with sensing means 25. Programmer means 26 is interposed in series connection between the right multiplier means 23 and the right sensing unit 25. As indicated by dashed lines, these interconnections are mechanical and serve ultimately to position respective coils with respect to suitable windings; such as Y windings; in the respective selsyn units 25. Right coil 89 in the right selsyn unit 25 is serially connected with resistor 91 and a power source 93; such as 110-v. alternating current power. Thus, the right selsyn unit 25 may be thought of as a transmitting selsyn unit.

Left coil 95 of left selsyn unit 25 is connected with the comparator 97 for sensing an error signal. Comparator 97 is also connected with AC power source 93 via conductor 99. Comparator 97 is also connected via conductor 101 and the automatic side of switch 103, designated AUTO, with DC power source 69. Moreover, comparator 97 has its output side connected with relays 105 and 107, which serve as the interrupted means for effecting interruption of the steer signal to the wheel that is being oversteered, or steered more than its correct relative degrees of steer with respect to the other wheel.

Relay 105 is mechanically connected, as indicated by dashed lines and the arbitrary code number 9, with normally closed switches 109 and 111 in respective conductor 77 to left steering relay 73 and conductor 83 to right steering relay 81. Opening switch 109 effects interruption of a steer left signal to the left wheel. Opening switch 111 effects interruption of a steer right signal to the right wheel.

Relay 107 is connected, as indicated by dashed lines and arbitrary code number 10, with normally closed switches 113 and 115 in respective conductor 77 to left steering relay 75 and conductor 83 to right steering relay 79. Opening switch 113 effects interruption of a steer left signal to the right wheel. Opening switch 115 effects interruption of a steer right signal to the left wheel.

Switch 103 serially connects, via its manual position, designated MAN, relay 117 with power source 69, so as to energize relay 117. Relay 117 is connected with normally closed switches 119–122, that are interposed in series with the respective steering relays and ground. Energizing relay 117 opens switches 119–122. Connected in parallel with switches 119–122 are limit switches 125–128. The respective limit switches 119–122 are opened, and at appropriate times serve to disconnect a steer signal, when either the right or the left wheel is steered more than a predetermined amount, such as 10°, from the straight-ahead position. Thus, when switch 103 is switched to the manual position, the steerable wheels can only be steered within a range of 10° to the right or to the left for reasons discussed hereinafter.

Figure 7:
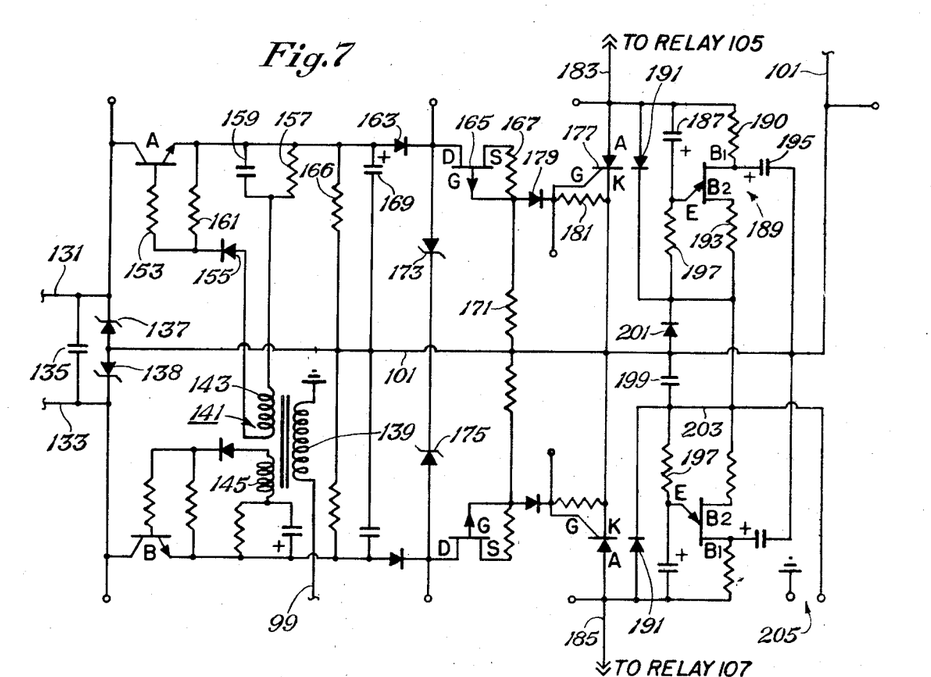
FIG. 7 is a schematic diagram of the electrical system employed in the comparator of FIG. 6.

A schematic of the electrical diagram employed in comparator 97 is illustrated in FIG. 7. Therein, incoming conductors 131 and 133, represent the conductors from coil 95 in left sensing means 25. In addition to the inlet conductors, the comparator means comprises phase responsive circuit means for determining which interrupter means to actuate for interrupting the steering signal to the wheel that is oversteered and a magnitude responsive circuit means for determining when neither interrupter means should be actuated or when both interrupter means should be actuated.

While there are overlapping portions of the circuit means; broadly, the phase responsive circuit means comprises parallel rectifying circuits for passing only one polarity signal such as the positive portion of the incoming signal and connected with respective interrupter means and including synchronous switches for delineating the phase of an error signal on conductors 131 and 133 with respect to an alternating current inlet signal on line 99. As noted hereinbefore, the alternating current inlet signal on line 99 is also the source of excitation for right coil 89 in the transmitting selsyn unit 25.

Specifically, capacitor 135 is serially connected with conductors 131 and 133. Back-to-back Zener diodes 137 and 138 are also serially connected with conductors 131 and 133 and in parallel with capacitor 135. The junction of Zener diode 137 with Zener diode 138 is connected with conductor 101 from the AUTO side of switch 103, FIG. 6. This arrangement, including the back-to-back Zener diodes 137 and 138, serves to pass only a particular phase; such as, the positive portion of the signal on conductors 131 and 133; to respective switches A and B; and also serves to protect the circuit from overloading since the Zener diodes will break down at some arbitrary voltage; for example, about 30 volts. Capacitor 135 protects the circuits from high-frequency noise and corrects for minor phase shifts due to the selsyn units.

Figure 8:
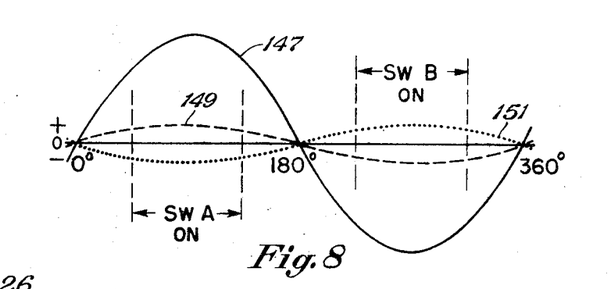
FIG. 8 is a diagrammatic representation of the alternating current type signals and the respective switches employed in FIG. 7.

Conductor 99 and primary winding 139 on transformer 141 are connected with power source 93 for effecting an inlet alternating current signal. Suitable transistors A and B are connected respectively and responsively with secondary windings 143 and 145 so as to be rendered conductive, or "on," during respective and opposite half cycles of the inlet signal, as illustrated in FIG. 8. Expressed otherwise, switch A (Sw A) is on for a portion of the interval during the first half of the sine wave 147, representing the inlet AC signal. The first half is from 0°–180° and the second half is from 180°–360°. Conversely, switch B is rendered conductive for a portion of the interval during the second half of the sine wave 147. Switches A and B should not be on throughout the respective halves, because of phase shifts due primarily to the selsyn units. If the error signal is represented by dashed line 149, the positive portion will be passed through switch A to signify, if its amplitude is great enough, that one of the steerable wheels should have its steer signal interrupted, since the error signal is in phase with the inlet signal. Since the polarity of the signal represented by line 149 is negative during the time switch B is conductive, it will not be passed to the circuit serially connected with switch B; and, hence, will not activate the interrupter means to the other steerable wheel.

Conversely, if the error signal, as represented by dotted line 151, is out of phase with inlet signal 147, it will not be passed during the time switch A is on, since it is negative in the interval from 0°–180°. It will be passed, however, to the circuit via switch B when switch B is on during the interval from 180°–360° of inlet signal 147. In the example of steer described immediately hereinbefore, the opposite phase error signal 151 will actuate, if its amplitude is sufficiently great, the interrupter means to interrupt the steering signal to the other steerable wheel.

Each of the synchronous switches A and B have a current limiting resistor 153 and a diode 155 serially connected with their base and with the respective secondary windings 143 and 145 for effecting the requisite synchronous action. Serially connected with the other output of the respective secondary windings 143 and 145 is a filter network comprising parallel connected resistor 157 and capacitor 159. As connected, this filter network eliminates the rendering conductive of the respective switches by spurious signals and decreases the forward bias such that the switches are not turned on immediately; but, as indicated in FIG. 8, are turned on only after the incoming signal 147 has reached an appreciable magnitude. A resistor 161 is connected in parallel with resistor 153 and the base output such as the emitter of the respective transistors serving as switches A and B for reducing leakage across the respective switches.

Blank terminals are provided at appropriate points in the circuit of the comparator, as shown in FIG. 7, to serve as test points for checking out the circuit in case there is a malfunction.

In the next section of each respective circuit serially connected with switches A and B, a constant current regulator circuit is provided and comprises serially connected diodes 162, field effect transistors 165 and resistors 167. The constant current regulator section effects increasing current with increasing voltage up to about 3 volts and a constant current thereafter up to the predetermined magnitude at which the Zener diodes across inlet conductors 131 and 133 break down. A second filter network comprising parallel coupled resistor 166 and capacitor 169 is connected with conductor 101 and with the respective junction of diodes 163 and the output side of the respective switches. Other resistor 171 is serially connected with conductor 101 and with the respective junction of the resistor 167 and the gate of field effect transistors 165.

Zener diodes 173 and 175 are serially connected in bucking relationship with the respective drains D of field effect transistors 165 for breaking down to effect a conductive path and actuate both interrupter means when the magnitude of the signal being passed by either switch A or switch B exceeds a predetermined maximum, indicating that the automatic steering system is not functioning properly in a given direction of turn. Specifically, Zener diodes 173 and 175 break down at a predetermined voltage; for example, about 15 volts; and actuate both interrupter means if an error signal of that magnitude is detected.

Each of the respective circuits serially connected through switches A and B employ a silicon-controlled rectifier (SCR) 177 as a latching switch for being rendered and remaining conductive as long as an appropriate signal of a magnitude greater than a predetermined minimum threshold exists on the respective circuit. The gate G of each SCR 177 is connected to the junction of diode 179 and resistor 181 for suitably biasing the gate to render SCR 177 conductive upon the occurrence of the appropriate signal. Diode 179 is also serially connected with the junction of resistors 167 and 171 and gate G of FET 165. As is well known with silicon-controlled rectifiers, once rendered conductive, they remain conductive until they are reverse biased. The SCR is employed instead of a relay because of this property; thus, preventing chattering of a relay at this point in the circuit because of small variations in amplitude near the minimum threshold.

As can be seen, once either SCR 177 is rendered conductive, power is supplied via its associated respective conductors 183 and 185 for actuating one or both of relays 105 and 107, serving as the interrupter means.

Since the SCR's 177 remain latched on, or conductive, an unlatching circuit must be provided for rendering them nonconductive as by biasing the anode negative. In each respective unlatching circuit, capacitor 187 is provided for storing a voltage and for being discharged into the anode of the SCR, driving it negative and rendering the SCR nonconductive. Unijunction transistor 189 is provided in series connection with capacitor 187 for determining the voltage to which the capacitor 187 is charged before being discharged into the anode of the SCR. Specifically, the emitter, the $B_1$ leg of the unijunction transistor and resistor 190 are connected in series with capacitor 187. The emitter and the $B_2$ leg of the unijunction transistor are also connected in series with capacitor 187 by way of diode 191 and resistor 193. The junctions of the respective $B_1$ legs and resistors 190 are connected via capacitors 195 with conductor 101. Capacitor 195 serves as a filter capacitor in the inverted system.

A resistor 197 is connected with the junction of capacitor 187 and the emitter E of the unijunction transistor and with the junction of diode 191 and resistor 193. Resistor 197 controls the interval of time between the discharging of the capacitor 187 into the anode and unlatching of the SCR. It has been found that about 50 milliseconds is a satisfactory length of time for the SCR to conduct before having the unlatching circuit attempt to render it nonconducting. Even if the capacitor 187 is discharged into the SCR to render it nonconducting, the unlatching attempt will be unsuccessful as long as a signal above the minimum threshold level is impressed on the gate G of SCR 177 to again render it conducting. Accordingly, the unlatching circuit will allow the capacitor 187 to charge an interval of time, determined in part by the magnitude of resistance in resistor 197 and the particular unijunction transistor being employed, before the SCR is attempted to be rendered nonconducting again.

Capacitor 199 is connected with conductor 101 and with the junction of the bottom diode 191 and bottom resistor 197. Diode 201 connects the junction of capacitor 199 and conductor 101 with the junction of top diode 191 and top resistor 197. The junction on the other side of capacitor 199 and the bottom diode 191 is connected via conductor 203 with a suitable source of power 205; such as, a positive 24-v. DC. Capacitor 199 and diode 201 prevent damage to the circuit if the conductor 203 is inadvertently connected with a negative voltage such as −24 v. DC.

OPERATION

In operation, the elements will have been connected as indicated hereinbefore, for example, FIGS. 1 and 6. Switch 103 is in the automatic position so vehicle 10 may be steered automatically by simple movement of steer switch 71 to the steer left or the steer right position. If moved to the left, a steer left signal is sent via conductor 77 and normally closed switches 109 and 113 to steer left relays 73 and 75. Since switches 119 and 120 are closed, the relays are actuated. Switches 125 and 126 will be closed, also, if the degrees of steer is within 10° of straight ahead. Relay 73 closes switch 207 and relay 75 closes switch 209. Consequently, power is supplied from power source 87 to both steering means to effect a steer to the left of both steerable wheels 11 and 13.

As the wheels begin to be steered to the left the respective multiplier means 23 double the degrees of steer effected from a 0° of steer and effect a representation that is ultimately sent to the respective right and left sensing means 25.

Interposed between right multiplier means 23 and right sensing means 25, however, is programmer means 26. In programmer means 26, FIG. 4, shaft 43 is rotated clockwise through the doubling and multiplying action of the gear train of multiplier means 23. The clockwise rotation is translated via first lever 47, bar 55, and second lever 49 into a greater degree of rotation of shaft 45 in the counterclockwise direction. The output from shaft 45 is then sent to right sensing means 25. A number of arrangements of the respective mechanical and electrical connections is possible to effect the desired result. It is desirable that the comparator determine that the right wheel is being oversteered with respect to its correct relative degrees of steer, as measured by the degrees of steer of the left wheel, and consequently, the degrees of steer of the right wheel should be increased by the output of the programmer in order that the comparator, if comparing directly, will sense that the right wheel is being oversteered and interrupt the steer signal to the right wheel by opening switch 113, deenergizing left steering relay 75 and opening switch 209. If desired, the output from right multiplier means 23 could drive shaft 43 in the opposite direction for a left turn and first lever 47 serve as the driving ellipse. In such an event, however, the driven ellipse and shaft 45 would rotate through a lesser number of degrees; and, consequently, the phase detection circuits through switches A and B in the comparator 97 would be reversed for this situation. Shafts 43 and 45 may also be reversed with appropriate attention to corresponding and compatible arrangement of the remainder of the system.

As illustrated, right coil 89 has about a 55-volt alternating current impressed across it and substantially in phase with the inlet signal of conductor 99. As long as the wheels are being steered their correct relative degrees of steer, right coil 89, in right selsyn 25 will effect, via the Y windings of the right and the left selsyns 25, zero (0) current output; or zero signal in left coil 95. Consequently, the comparator will signal neither interrupter and both wheels will continue to steer in response to the steer left signal. Within a few degrees, the exact number depending upon the minimum threshold at which the comparator is designed to respond, an error signal is detected in left coil 95. Through operation of the phase detection circuits, it will be determined, that the right wheel is being steered more than its correct relative degrees of steer and a signal will be sent over conductor 185 to actuate relay 107, opening switch 113 to interrupt, or modify, the steer signal. Specifically, as related to FIGS. 7 and 8, as described hereinbefore, a signal similar to dotted line 151, FIG. 8 will be given to indicate that the signal on coil 95 is out of phase with respect to the inlet signal from power source 93 on conductor 99 and the positive portion will be transmitted via switch B and the lower SCR to impose a signal on conductor 185. About 50 milliseconds later, the unlatching circuit will release relay 107, and a steer left signal will again be impressed on the right steering means to effect left degrees of steer of the right wheel.

As soon as the right wheel is again steered more than its correct relative degrees of steer, the cycle is repeated and it is again interrupted. Thus, in going from 0° of steer to the left, the right wheel, the outside wheel in the turn, will have its steer signal interrupted repeatedly.

When the vehicle has been steered a desired number of degrees to the left, a return to the straight ahead position may be desired. Consequently, the operator moves the steer switch 71 to the steer right position. A steer right signal is sent via normally closed switches 111 and 115 to right steering relays 79 and 81. Since switches 121 and 122 are closed, the relays 79 and 81 are actuated, closing switches 211 and 213. Also connected in the ground, or common, of right steering relays 79 and 81 are limit switches 127 and 128 which are also closed; although the other limit switches 125 and 126 may be open if more than 10° steer to the left has been effected. As a result of closing switches 211 and 213, power is supplied from power source 87 to both steering means 21 and, consequently, steer wheels 11 and 13 to the right.

In the return toward zero degrees of steer, the output from programmer means 26 via shaft 45 will return toward the zero degrees of steer position at a faster rate than shaft 43, just as it moved to the left at a faster rate; and also faster than does left sensing means 25. Consequently, right coil 89 in right selsyn unit 25 will soon lead left coil 95, but in an opposite direction to that which occurred in the steer to the left. Thus, comparator 97 will sense an in phase error signal, opposite to the out of phase error signal detected in the turn to the left. Yet, the steer signal must be interrupted to the right wheel since it is to be steered a lesser number of degrees to the right than is the left wheel to return to 0° of steer. Nevertheless, comparator 97 detects an in phase error signal and transmits its positive component through switch A, turning on the SCR 177 and sending an output signal on conductor 183 to actuate relay 105. Relay 105 opens normally closed switch 111, deenergizing right steering relay 81 and opening switch 213. Thus, an error signal of an opposite phase effects interruption of the steer signal to the same wheel in returning to zero position, although by way of a different relay.

As in the turn to the left, the steer signal to the right wheel will be interrupted a plurality of times. Ordinarily, the steer signal to the right wheel will be interrupted about the same number of times in going back to zero that it was interrupted in going to the steer to the left.

In the event the steer right signal is continued past the zero, or straight ahead position of steer, the right coil 89, connected with shaft 45, will be rotated through a lesser number of degrees than shaft 43. Thus, the left coil 95 will soon begin to lead; or conversely, right coil 89 will soon begin to lag; and comparator 97 will detect an error signal that is out of phase with the inlet signal. This out of phase error signal is the same type of error signal that was encountered in the steer to the left. Yet, comparator 97 must be so connected as to interrupt the steer signal to the left wheel, whereas in the steer to the left it interrupted the steer signal to the right wheel. Specifically, the out of phase error signal is detected and an output signal from comparator 97 is sent via conductor 185 to relay 107. Relay 107 opens normally closed switch 115. Consequently, right steering relay 79 is deenergized, opening switch 211. Thus, the steer right signal to the left steering means 21 is interrupted by the detection of the out of phase error signal in the steer to the right. Expressed otherwise, the out of phase error signal serves as an indication that the left wheel is being steered to the right more than its correct relative degrees of steer with respect to the right wheel.

Similarly, as occurred in steering the right wheel to the left, the steer right signal to the left wheel will be interrupted and restored a plurality of times, dependent, among other things, on the time constant at which the unlatching circuit unlatches the SCR and upon the minimum threshold, or sensitivity of the comparator.

Once the desired degree of steer of the vehicle to the right has been accomplished, the operator may choose to return the wheels to the straight ahead, or 0° of steer, position. Consequently, steer switch 71 is moved to the left and power is sent to left steering relays 73 and 75 via conductor 77 and normally closed switches 109 and 113. Since switches 119 and 120 and limit switches 125 and 126 will be closed, left steering relays 73 and 75 are energized, closing switches 207 and 209. Accordingly, power is supplied from power source 87 to steer both steering means 21 and, consequently, both wheels to the left, or back toward 0° of steer.

In the return to the 0° of steer from the right, the output from programmer means 26 via shaft 45 will return toward zero at a slower rate, just as it went to the right at a slower rate. Consequently, right coil 89 is right selsyn unit 25 will soon lag behind left coil 95 in left selsyn unit 25. Thus, the comparator will sense an error signal that is in phase with the inlet signal on conductor 99. Yet, the in phase signal must result in an interruption of the steer left signal to the left wheel. Specifically, comparator 97 will detect the in phase error signal and impose an output signal on conductor 183 to relay 105. Relay 105 will open normally closed switch 109, deenergizing left steering relay 73 and opening switch 207. Thus, the left wheel, which is steered to the right a lesser number of degrees than the right wheel, will have its steer left signal interrupted a plurality of times in returning to the 0° of steer position, as it was interrupted in being steered to the right.

The foregoing descriptive material presupposes a normal operation of the automatic steering system in which the positive component of the error signal is conducted, by either switch A or switch B depending upon whether it is in phase or out of phase with the inlet signal, to the active circuit in the comparator. As indicated from the descriptive material of the electrical schematic of FIG. 7, the error signal is maintained within a desirable voltage range. When above the minimum threshold the respective SCR is rendered conductive to impose an output signal on either conductor 183 or 185 when there is an error signal. Once the particular SCR is rendered conductive, it continues to conduct until its anode is driven negative. Consequently, the unlatching circuit allows the capacitor 187 to be charged to a voltage determined by the unijunction transistor 189 and the capacitor is then discharged to the anode to drive it negative and stop the conduction of the SCR. If the signal is still on gate G of SCR 177, the SCR is immediately rendered conductive again. Otherwise, the signal to the respective relay is stopped and the particular steer signal is again imparted to the associated steering means.

As indicated hereinbefore, however, should the signal become great enough; for example, above the magnitude of about 15 volts; to indicate that a malfunction has occurred in the automatic steering system effecting synchronous steer of the wheels, both relays 105 and 107 are energized. Thus, further steer in the direction being signaled by the operator becomes impossible for either wheel. Specifically, Zener diodes 173 and 175 break down when the breakdown voltage; for example, about 15 volts; is exceeded, and both SCR's are rendered conductive; effecting opening of all four switches 109, 111, 113 and 115. Consequently, either both right steering relays or both left steering relays are deenergized, depending upon the direction in which the steer switch 71 had been moved. Further automatic steering in either direction is no longer possible.

When the automatic steering becomes inoperative, switch 103 is moved to the manual position. Movement of switch 103 to manual position prevents energizing relays 105 and 107 and allows normally closed switches 111, 109, 113, and 115 to remain closed; and it also energizes relay 117 and opens normally closed switches 119-122. Opening of the switches 119-122 prevents further steering of any wheel in a given direction if it is steered more than 10° in the direction of steer and its limit switch, of limit switches 125-128, is open. Specifically, assume that the left wheel has been steered more than 10° to the left when the automatic steering is rendered inoperative by some malfunction Limit switch 125 will be open. When switched to the manual position, switch 119 is also opened, and left steering relay 73 cannot be energized and no steer left signal can be sent left steering means 21. If the right wheel has been steered less than 10° and limit switch 126 is closed, it may be possible to steer right wheel to the left to the 10° limit via left steering relay 75. In the event that the right wheel has been steered to the left more than 10° and limit switch 126 is open, the right wheel cannot be steered to the left either.

Both wheels can be steered to the right, however, since limit switches 127 and 128 will be closed and since switches 111 and 115 are closed. Thus, in the manual position, the wheels may be steered back to a position in which they are again in synchronization such that the automatic steering can become operative, if the malfunction is corrected. Such synchronization is readily effected if both wheels are manually steered to the right until stopped by the 10° limit switches 127 and 128.

If the malfunction is not corrected, the operator will have to manually steer each wheel. If desired, individual steering switches may be employed but are not ordinarily necessary; since with such manual steering, neither wheel may be steered more than the preset maximum such as 10° to the right or left, as indicated. The preset limitation prevents oversteering of the wheels an amount sufficient to cause structural damage to the vehicle, yet allows enough maneuverability that an operator can get the vehicle to a location where repairs can be made to correct the malfunction in the automatic steering system.

While the programmer means has been shown herein as being mechanically coupled with the multiplier means and with the sensing means for one of the wheels, it may be employed in any way so as to modify what would otherwise be the unmodified output signals from the particular sensing means with which it is associated. What is significant is that it modify what would otherwise be the unmodified output in accordance with the ellipsoidal program, described specifically hereinbefore.

On the other hand, any other type of sensing means, such as potentiometers, and compatible comparator means, such as voltage comparators, may be employed as long as they have the functional capabilities delineated hereinbefore.

As illustrated in FIG. 5, the modifier means 63 and 65 are shown separate from actuator means 61. This need not be the case, as indicated in FIG. 6, since the actuator means may comprise widely spaced relays that are actuated in response to a low-voltage electrical system but which, in response to their actuation, effect interconnection of a much higher voltage power source with the actual steering means. Expressed otherwise, as indicated by dashed line 217 in FIG. 5, the interconnection between the modifier means and the actuator means may be an intraconnection within an overall system serving functionally as the actuator means.

Moreover, the respective modifier means, as indicated hereinbefore, may comprise means for stepping up the voltage of, or increasing the steer signal to a wheel that is lagging behind the other, instead of interrupting the signal to the wheel that is ahead with respect to the other. In such an event, the relationships discussed hereinbefore will be reversed.

Electrical, hydraulic, or mechanical systems, servos, and signals can be employed in any particular combination instead of the specific equivalents described in detail hereinbefore.

Although the invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:

1. A method of steering a vehicle having attached to a frame two separately steerable wheels and respective separate steering means comprising:
   a. generating a steer signal to effect a turn of said vehicle in a predetermined direction;
   b. imparting said steer signal to said steering means and steering both said wheels in the direction indicated by said steer signal;
   c. sensing the degrees of steer of the respective wheels; and
   d. modifying the steer signal to the steering means associated with the steerable wheel that departs from its relative degrees of steer with respect to the other steerable wheel; the relative degrees of steer of said steerable wheel being related to the degrees of steer of the other steerable wheel as the number of degrees of rotation of a first focal point of driven ellipse is related to the number of degrees of rotation of the opposite focal point of a driving ellipse rotating twice the number of degrees that the said other wheel is steered, said ellipses being identical, being placed tangential such that their focal points on their major axes form the apices of a rectangle at the position equivalent to 0° of steer, having a set of first and opposite focal points disposed a fixed distance apart and located at points fixed in space and having their other respective and opposite focal points on their major axes in fixed spaced relationship but free to move in a plane.

2. The method of claim 1 wherein the modifying of step (d) comprises interrupting the steer signal to the oversteered wheel that is being steered more than its said relative degrees of steer with respect to said other steerable wheel.

3. The method of claim 2 wherein two outside nonsteering wheels are also attached to said frame and said identical ellipses have a distance between the two focal points on each respective major axis of each ellipse that is equal to said major axis multiplied by the cosine of angle α generated by lines extending from a midpoint between said outside nonsteering wheel attached to said frame to one of said outside, nonsteering wheels and to the steerable wheel on the same side as said one of said outside, nonsteering wheels and said ellipses have each respective minor axis length that is equal to said major axis length multiplied by the sine of the angle α.

4. The method of claim 2 wherein said oversteered wheel is the outside wheel on a turn from 0° of steer; said other steerable wheel is the inside wheel on said turn; and said driven ellipse is rotated through a different number of degrees than said driving ellipse.

5. In a wheeled vehicle having a vehicle frame, a steering system comprising:
   a. two wheels attached to said frame and separately steerable;
   b. two steering means, each connected respectively with one of said wheels and operable to steer said wheel in response to a steer signal;
   c. actuator means connected with said steering means for effecting a turn of said vehicle by generating a steer signal;

d. modifier means interposed in connection with said actuator means and with respective said steering means and operable to modify the steer signal from said actuator means to respective said steering means;

e. two multiplier means, each being connected with a respective wheel for doubling the degrees through which said wheel has been steered from 0° of steer and adapted to generate a first representation that is a function of twice the degrees of steer for the respective wheel;

f. two sensing means, each being connected with a respective multiplier means and operable to effect a respective output signal that is a predetermined function of the respective first representation;

g. comparator means connected with said sensing means and said modifier means and operable to effect, in response to the output signals from said sensing means, modification of the steer signal to the respective steering means associated with a steerable wheel that departs from its relative degrees of steer with respect to the other steerable wheel; and h. programmer means connected with one of said sensing means so as to modify what would otherwise be its unmodified output signal to an output signal that is related to the unmodified output signal as the degrees of rotation of the first focal point of a driven ellipse is related to the number of degrees of rotation of the opposite first focal point of a driving ellipse rotating twice the number of degrees that the steerable wheel associated with said one of said sensing means is steered; said ellipses being identical, being placed tangential such that their focal points on their major axes form the apices of a rectangle at the position equivalent to 0° of steer, having a set of first and opposite focal points disposed a fixed distance apart and located at points fixed in space and, having their other respective and opposite focal points on their major axes in fixed spaced relationship but free to move in a plane.

6. The steering system of claim 5 wherein said modifier means is an interrupter means that is operable to effect electrical disconnection, upon a suitable signal from said comparator means, of the actuator means from the steering means associated with an oversteered wheel that is being steered more than its relative degrees of steer with respect to the other steerable wheel; and said multiplier means, said programmer means, said sensing means and said comparator means are operable to delineate said oversteered wheel and to effect the suitable signal to said interrupter means.

7. The steering system of claim 5 wherein said programmer means comprises as said ellipses a first shaft with its center at the focal point of said driving ellipse and having rigid connection means with a first connecting means located with its center at the other focal point on the major axis of said driving ellipse, and a second shaft with its center at the opposite focal point of said driven ellipse and having second rigid connection means with a second connecting means located with its center at the other focal point on the major axis of said driven ellipse; said first connecting means and said second connecting means being maintained in fixed spaced relationship but free to move in a plane, and as opposite focal points by a connecting bar; and meshing means attached to respective said rigid connection means and located at the points in space equivalent to the maximum dimensions of the major axis of each respective ellipse to move said rigid connection means from dead center position and maintain said shafts as opposite focal points.

8. The steering system of claim 7 wherein the distance between each respective shaft and connecting means along the respective rigid connection means is the major axis of said ellipse multiplied by the cosine of an angle $\alpha$ that is the smallest absolute angle included between a first line which is the axis of a nonsteering wheel attached to said frame and a second line which extends from a steering point on the first line to the pivot axis of the steerable wheel on the same side as said nonsteering wheel, and said shafts and said connecting means are so spaced as to define a minor axis length of said ellipse that is the major axis length multiplied by the sine of the angle $\alpha$.

9. The steering system of claim 8 wherein there are two nonsteering wheels have a common axis and said steering point is the midpoint of said common axis between said two nonsteering wheels.

10. The steering system of claim 7 wherein the effective radius of said respective meshing means is equal to said major axis multiplied by $(\sin \alpha)^2$.

11. The steering system of claim 7 wherein said steering means is an electric motor turning an arrangement of gears connected so as to impart steer to said wheel in response to rotation of said motor; and said actuator means comprises a turn switch mounted on an operator's console and adapted for generating a steer left signal when moved in one direction and for generating a steer right signal when moved in another direction and a source of electrical power.

12. The steering system of claim 7 wherein said sensing means comprise a pair of selsyn units, each being positioned responsively to the degrees of steer of its respective steerable wheel; said pair of selsyns being also coconnected electrically to effect zero output signal when a first steerable wheel has its correct relative degrees of steer with respect to the other steerable wheel; and to effect an output signal that indicates with respect to an inlet signal when a first movable element in a first selsyn leads the corresponding second movable element in a second selsyn and when said first movable element lags behind said second movable element.

13. The steering system of claim 12 wherein said comparator means comprises a phase responsive circuit means for determining when said output signal is in phase with said inlet signal and for energizing a first interrupter means, and when said output signal is out of phase with said inlet signal and for energizing a second interrupter means; and a magnitude-responsive circuit means for determining when neither of said interrupter means should be actuated and when both of said interrupter means should be actuated.

14. The steering system of claim 13 wherein said interrupter means are connected so that one of said interrupter means effects interruption of a steer left signal to the right steerable wheel and a steer right signal to the left steerable wheel and the other of said interrupter means effects interruption of a steer right signal to the right steerable wheel and a steer left signal to the left steerable wheel.

15. The steering system of claim 13 wherein said phase-responsive circuit comprises parallel rectifying circuits for passing only one polarity signal and connected with respective interrupter means and with respective switch means; only one of said switch means being closed during the positive phase of said alternating current inlet signal, and only the other of said switch means being closed during the negative phase of said alternating current inlet signal, and said magnitude-responsive circuit means comprises a gate means for ultimately actuating one of said interrupter means when a signal magnitude above a minimum threshold is detected, and a shorting means for actuating both said interrupter means when a signal magnitude above a predetermined maximum is detected.

16. The steering system of claim 15 wherein said magnitude-responsive circuit means includes a latching circuit that latches on when said gate means detects a signal greater than said minimum threshold, and an unlatching circuit that is adapted to render said latching circuit nonconducting when it is conducting and in the absence of said signal on said gate means.

17. The steering system of claim 7 wherein each steerable wheel is steerable through 360°.

\* \* \* \* \*